(12) United States Patent
Okamoto et al.

(10) Patent No.: US 9,145,836 B2
(45) Date of Patent: Sep. 29, 2015

(54) ENGINE MOUNTED CONTROLLER, AND VEHICLE

(71) Applicant: HONDA MOTOR CO., LTD., Minato-Ku, Tokyo (JP)

(72) Inventors: Hideyuki Okamoto, Utsunomiya (JP); Tatsuhiro Yone, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/407,702

(22) PCT Filed: Apr. 24, 2014

(86) PCT No.: PCT/JP2014/061517
§ 371 (c)(1),
(2) Date: Dec. 12, 2014

(87) PCT Pub. No.: WO2014/185244
PCT Pub. Date: Nov. 20, 2014

(65) Prior Publication Data
US 2015/0152798 A1 Jun. 4, 2015

(30) Foreign Application Priority Data
May 15, 2013 (JP) ................. 2013-102993

(51) Int. Cl.
| | |
|---|---|
| F02N 11/08 | (2006.01) |
| F02D 17/00 | (2006.01) |
| F02D 17/04 | (2006.01) |
| F16F 15/02 | (2006.01) |
| F02D 41/00 | (2006.01) |
| F02D 31/00 | (2006.01) |

(52) U.S. Cl.
CPC ............ *F02D 17/04* (2013.01); *F02D 31/00* (2013.01); *F02D 41/009* (2013.01); *F02N 11/0844* (2013.01); *F16F 15/02* (2013.01); *F02D 2041/0092* (2013.01); *F02N 2200/021* (2013.01)

(58) Field of Classification Search
CPC ..... F02D 17/04; F02D 31/00; F02N 11/0844; F02N 11/0814; F02N 11/0818; F16F 15/02
USPC ..................... 123/179.3, 179.4, 339.1, 192.1; 701/110–113; 73/114.07
See application file for complete search history.

(56) References Cited

FOREIGN PATENT DOCUMENTS

| | | |
|---|---|---|
| JP | 2005-337055 A | 12/2005 |
| JP | 2007-076580 A | 3/2007 |
| JP | 2011-252553 A | 12/2011 |

OTHER PUBLICATIONS

The International Search Report from PCT/JP2014/061517, WO 2014/185244, (Form PTO/ISA/210), and the English translation thereof.

*Primary Examiner* — Hai Huynh
(74) *Attorney, Agent, or Firm* — Carrier Blackman & Associates, P.C.; Joseph P. Carrier; William D. Blackman (57) ABSTRACT

Provided are: an engine-mounted controller capable of being suitably used in a vehicle that carries out an idle-stop operation while the vehicle is moving; and a vehicle. An engine-mounted controller of a vehicle determines whether or not an engine is in a completely stopped state when an idle-stop operation is canceled. If the controller determines that the engine is in a completely stopped state, a first control operation for suppressing the transmission of engine vibrations associated with engine idling is executed on the assumption that the engine is in a completely stopped state, and if the controller determines that the engine is not in a completely stopped state, the first control operation is prohibited when the engine restarts.

10 Claims, 6 Drawing Sheets

ENGINE MOUNTED CONTROLLER, AND VEHICLE

TECHNICAL FIELD

The present invention relates to a vehicle and an engine mount control apparatus (engine-mounted controller) provided in the vehicle for carrying out a vibration suppression control for suppressing transmission of engine vibration to a vehicle body by driving an actuator, which is incorporated in an engine mount that supports the engine in the vehicle body.

BACKGROUND ART

Japanese Laid-Open Patent Publication No. 2011-252553 (hereinafter referred to as "JP 2011-252553 A") has the object of providing an active vibration control supporting device, which is capable of appropriately suppressing and controlling transmission of vibration, so as to prevent rolling natural vibrations that are generated when the engine is started from being transmitted to a vehicle body (see paragraph[0006] and abstract). For accomplishing this object, an ACM_ECU 71 of JP 2011-252553 A acquires a crank angle from an engine AT_ECU before the engine is started, through a CAN communication line 207, in a motoring-time rolling natural vibration control unit 241 upon detecting a start of motoring. In addition, a vibration start timing, an input vibration load, a vibration frequency, and a vibration period of the rolling natural vibration, in conformity with the acquired crank angle before the engine is started, are calculated on the basis of rolling natural vibration characteristic data of a data unit 241a, to thereby generate a drive current waveform in a drive current computational unit 236. Then, based on the drive current waveform, drive control units 238A, 238B are used to control active control mounts $M_F$, $M_R$ (see abstract). The aforementioned "crank angle before the engine is started" implies a crank angle at a time that the engine is stopped (see paragraph[0035]).

SUMMARY OF INVENTION

According to JP 2011-252553 A, as described above, using the crank angle (crankshaft rotational position) when the engine is stopped, a vibration start timing, an input vibration load, a vibration frequency, and a vibration period of the rolling natural vibration (rolling resonance) are calculated.

Incidentally, recently, with the object of improving fuel consumption and the like, an idling stop (stopping of fuel injection) has been carried out. In the case that an idling stop is carried out during traveling of the vehicle (i.e., in a state in which the velocity of the vehicle is other than zero), the engine continues to rotate even though the explosion process is stopped. Therefore, a case may be considered in which, before the rotational speed of the engine reaches zero, the idling stop is terminated or released, and the engine is restarted.

In such a case, assuming that the crankshaft rotational position at the time of an idling stop is used, since the crankshaft rotational position changes due to continued subsequent rotation of the engine, it cannot be known what the crankshaft rotational position is upon restarting of the engine, and adequate vibration damping performance cannot be obtained. Further, if it is attempted to wait until the engine rotational speed becomes zero and acquire the crankshaft rotational position, then the engine is restarted before the engine rotational speed becomes zero, and the control technique of JP 2011-252553 A cannot be used.

The present invention has been devised taking into consideration the aforementioned problems, and has the object of providing an engine mount control apparatus and a vehicle incorporating the same, which can be used suitably in a vehicle in which an idling stop control is carried out during traveling thereof.

An engine mount control apparatus according to the present invention carries out a vibration suppression control for suppressing transmission of engine vibration to a vehicle body by driving an actuator, which is incorporated in an engine mount that supports an engine in the vehicle body. The engine mount control apparatus is configured to judge whether or not the engine is in a completely stopped condition, at a time that an idling stop of a vehicle is released. If it is judged that the engine is in a completely stopped condition, the engine mount control apparatus is configured to implement a first restart time control for suppressing transmission of the engine vibration accompanying motoring of the engine, the first restart time control being premised on the engine being in the completely stopped condition, and if it is judged that the engine is not in the completely stopped condition, the engine mount control apparatus is configured to prohibit the first restart time control.

According to the present invention, when the idling stop of the vehicle is released, if the engine is in a completely stopped state, the first restart time control is implemented, whereas if the engine is not in a completely stopped state, the first restart time control is prohibited. Therefore, the first restart time control is implemented in an appropriate situation, so that the vibration damping capability can be enhanced.

The above-described engine mount control apparatus may implement a normal control for suppressing the engine vibration when the engine is being operated accompanying an explosion process, and may stop the normal control at a time that the vehicle is subjected to the idling stop. Furthermore, assuming that a rotational speed of the engine in which rolling resonance is generated during motoring of the engine is defined as a rolling resonance generating engine rotational speed, the engine mount control apparatus may implement a second restart time control for suppressing transmission of the engine vibration accompanying the motoring of the engine, the second restart time control being premised on the engine not having been completely stopped, if during a period of time after the vehicle has been subjected to the idling stop but before the engine has completely stopped, it is judged that the idling stop has been released and that the rotational speed of the engine is less than a first engine rotational speed threshold, which is the rolling resonance generating engine rotational speed or a value in vicinity thereof, or it is judged that the idling stop has been released and that a rotational position of the engine is less than a first engine rotational position threshold, which is a rotational position corresponding to the rolling resonance generating engine rotational speed or a value in vicinity thereof.

Consequently, in accordance with the above features, even in the event that the first restart time control using the engine rotational position upon stoppage, which exhibits comparatively good accuracy in most cases, cannot be used, it is still possible for engine vibration to be suppressed by using the second restart time control, which is based on the engine rotational speed or the engine rotational position. Accordingly, regardless of whether or not the engine is in a completely stopped state, engine vibration can be suppressed, and the vibration damping capability can be enhanced.

In the above-described engine mount control apparatus, in the first restart time control, the engine mount control apparatus may acquire an engine rotational position upon stoppage, which is a rotational position of the engine in a state in which the engine is completely stopped upon or prior to start of the motoring, may set an operation start timing for starting operation of the actuator with respect to the engine vibration based on the engine rotational position upon stoppage, and when the operation start timing is reached, may start operation of the actuator with respect to the engine vibration.

In accordance with this feature, by using the engine rotational position upon stoppage, engine vibration can be suppressed with high accuracy using the first restart time control.

In the above-described engine mount control apparatus, in the second restart time control, the engine mount control apparatus may start operation of the actuator with respect to the engine vibration, at a time that the rotational speed of the engine is less than or equal to the first engine rotational speed threshold and greater than or equal to a second engine rotational speed threshold, and a rate of change of the rotational speed of the engine is positive, or at a time that the rotational position of the engine is less than or equal to the first engine rotational position threshold and greater than or equal to a second engine rotational position threshold, and the rate of change of the rotational speed of the engine is positive.

Consequently, in accordance with the above features, even in the event that the first restart time control using the engine rotational position upon stoppage, which exhibits comparatively good accuracy in most cases, cannot be used, it is still possible for engine vibration to be suppressed by using the second restart time control, which is based on the engine rotational speed or the engine rotational position.

In the above-described engine mount control apparatus, the rotational position of the engine may be calculated or acquired, based on an output of a rotational position sensor of a traction motor or a starter motor. Consequently, in the event that the rotational position sensor of the traction motor or the starter motor exhibits higher precision (higher angular resolution) than the rotational position sensor of the engine itself, it is possible for an engine rotational position with enhanced accuracy to be used.

In the above-described engine mount control apparatus, the rotational position and the rotational speed of the engine may be calculated or acquired, based on an output of a rotational position sensor. Consequently, in the event that the rotational position sensor of the traction motor or the starter motor exhibits higher precision (higher angular resolution) than the rotational position sensor of the engine itself, it is possible for an engine rotational position and an engine rotational speed with enhanced accuracy to be used.

In the above-described engine mount control apparatus, the engine mount control apparatus may start calculation or acquisition of the rotational position of the engine before the motoring is started, in a case that information is acquired, which indicates that a pressing operation of an accelerator pedal or an easing-up or returning operation of a brake pedal is being carried out, after the vehicle is subjected to the idling stop and before the engine is completely stopped. In accordance with this feature, by initiating calculation of the engine rotational position from a point in time after it has been confirmed that an operation to release the idling stop has been performed by the driver, a long preparation time until the second restart time control begins can be assured, so that the calculation can be performed reliably in association with the second restart time control, or calculations can be carried out multiple times in association with the second restart time control.

In the above-described engine mount control apparatus, the engine mount control apparatus may start calculation or acquisition of the rotational speed of the engine before the motoring is started, in a case that information is acquired, which indicates that a pressing operation of an accelerator pedal or an easing-up or returning operation of a brake pedal is being carried out, after the vehicle is subjected to the idling stop and before the engine is completely stopped. In accordance with this feature, by initiating calculation of the engine rotational speed from a point in time after it has been confirmed that an operation to release the idling stop has been performed by the driver, a long preparation time until the second restart time control begins can be assured, so that the calculation can be performed reliably in association with the second restart time control, or calculations can be carried out multiple times in association with the second restart time control.

In the above-described engine mount control apparatus, the operation start timing may be a point in time after elapse of a waiting time from the start of the motoring, and the waiting time may be a time period in which a correction is made to a standard waiting time that is set beforehand from the motoring of the engine until rolling resonance occurs, the correction being responsive to the engine rotational position upon stoppage. In accordance with this feature of the invention, the standard time from motoring of the engine until rolling resonance occurs can be set beforehand as the standard waiting time, whereby the standard waiting time can be corrected in accordance with the engine rotational position upon stoppage. Consequently, the computational cost for calculating the operation start timing can be suppressed, and it is possible for several other calculations, which are performed by the engine mount control apparatus, to be implemented.

A vehicle according to the present invention is characterized by having incorporated therein the aforementioned engine mount control apparatus.

According to the present invention, when the idling stop of the vehicle is released, if the engine is in a completely stopped state, the first restart time control is implemented, whereas if the engine is not in a completely stopped state, the first restart time control is prohibited. Therefore, the first restart time control is implemented in an appropriate situation, so that the vibration damping capability can be enhanced.

DESCRIPTION OF EMBODIMENTS

Figure 1:
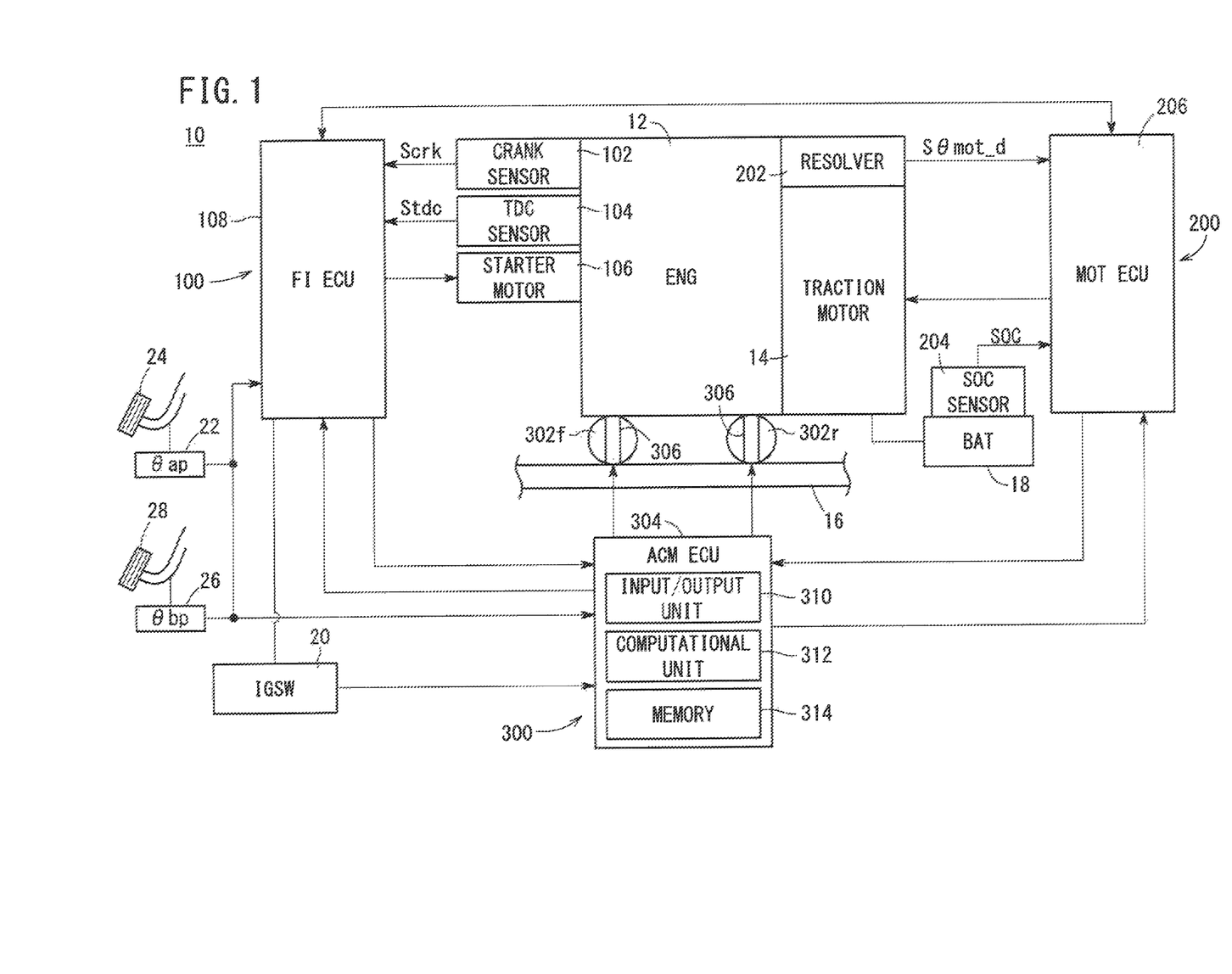
FIG. 1 is a schematic diagram showing a vehicle according to an exemplary embodiment of the present invention.

A. Embodiment
1. Configuration
[1-1. Overview]
FIG. 1 is a schematic diagram showing a vehicle 10 according to an exemplary embodiment of the present invention. As shown in FIG. 1, the vehicle 10 is a so-called hybrid vehicle that includes, as a drive source, an engine 12 and a traction motor 14. As will be described later, the vehicle 10 may be a so-called engine vehicle that does not include the traction motor 14.

The engine 12 is supported in a vehicle body 16 through engine mounts 302f, 302r, in a state such that the axis of rotation thereof is oriented in a lateral or widthwise direction of the vehicle. As will be described later, the engine mounts 302f, 302r constitute part of an active vibration damping support apparatus 300 for actively suppressing vibration from the engine 12 (hereinafter also referred to as "engine vibration") by actuators 306.

The traction motor 14 according to the present embodiment, in addition to generating a traveling drive force (and more specifically, transmitting the drive force to non-illustrated wheels) of the vehicle 10 based on electric power supplied from a battery 18, also serves as a motor (electric motor), which is used during motoring (cranking) of the engine 12.

The vehicle 10, in addition to the active vibration damping support apparatus 300, includes an ignition switch (hereinafter referred to as an "IGSW 20"), an engine control system 100 associated with control of the engine 12, and a motor control system 200 associated with control of the traction motor 14. Furthermore, the vehicle 10 includes an accelerator pedal sensor 22 that detects an operating amount of an accelerator pedal 24 (hereinafter referred to as an "accelerator pedal operating amount $\theta ap$"), and a brake pedal sensor 26 that detects an operating amount of a brake pedal 28 (hereinafter referred to as a "brake pedal operating amount $\theta bp$"). Concerning the basic structural elements of the vehicle 10, the same or similar features to those shown in JP 2011-252553 A can be used.

[1-2. Engine Control System 100]

The engine control system 100 includes, as structural elements associated with the engine 12, a crank sensor 102, a top dead center sensor 104 (hereinafter referred to as a "TDC sensor 104"), a starter motor 106, and a fuel injection electronic control unit 108 (hereinafter referred to as an "FI ECU 108").

The crank sensor 102 detects a rotational position of a non-illustrated crankshaft (herein after referred to as a "crankshaft rotational position $\theta crk$"), and a signal representing the crankshaft rotational position $\theta crk$ (hereinafter referred to as a "crank pulse signal Scrk") is output to the FI ECU 108. The TDC sensor 104 detects when a non-illustrated engine piston comes to a top dead center (top dead center timing), and a signal representing the top dead center timing (hereinafter referred to as a "TDC signal Stdc") is output to the FI ECU 108. Moreover, the outputs of the respective sensors 102, 104 may be output directly to an ECU (e.g., a later-described ACM electronic control unit 304) apart from the FI ECU 108.

The starter motor 106 is a motor (electric motor) that is used during motoring of the engine 12, which transmits a drive force only with respect to the engine 12 based on electric power supplied from a non-illustrated low voltage battery. The starter motor 106 of the present embodiment is a DC type of motor, but may be an AC type of motor. At a time of motoring of the engine 12, any one of the traction motor 14 and the starter motor 106 is selected and used.

The FI ECU 108 controls the engine 12 based on respective types of signals, such as the crank pulse signal Scrk, the TDC signal Stdc, etc. For example, the FI ECU 108 is used to calculate a rotational speed (hereinafter referred to as an "engine rotational speed Ne") [rpm] of the engine 12, based on the crank pulse signal Scrk. Similar to the later-described ACM electronic control unit 304, the FI ECU 108 includes an input/output unit, a computational unit, and a memory, none of which are shown.

[1-3. Motor Control System 200]

As shown in FIG. 1, the motor control system 200 includes, as structural elements associated with the traction motor 14, a resolver 202, an SOC sensor 204, and a motor electronic control unit 206 (hereinafter referred to as a "motor ECU 206" or an "MOT ECU 206").

The resolver 202 (rotational position sensor) detects a rotational position of a non-illustrated rotor of the traction motor 14 (hereinafter referred to as a "traction motor rotational position $\theta mot\_d$", a "motor rotational position $\theta mot\_d$", or a "rotational position $\theta mot\_d$"), and outputs a signal representing the rotational position $\theta mot\_d$ (hereinafter referred to as a "traction motor rotational position signal S$\theta mot\_d$" or simply a "signal S$\theta mot\_d$") to the MOT ECU 206. In the present embodiment, the angular resolution of the resolver 202 is higher than the angular resolution of the crank sensor 102. More specifically, if the crank sensor 102 detects angular positions at each of angles D1° and the resolver 202 detects angular positions at each of angles D2°, then D1>D2.

The SOC sensor 204 detects a residual capacity or state of charge (SOC) of the battery 18, and outputs the same to the MOT ECU 206.

The motor ECU 206 controls the traction motor 14 based on respective types of input values, such as the motor rotational position $\theta mot\_d$, the SOC, etc. Similar to the later-described ACM electronic control unit 304, the motor ECU 206 includes an input/output unit, a computational unit, and a memory, none of which are shown.

According to the present embodiment, for example, it is determined whether or not it is necessary to drive the engine 12 and the traction motor 14, depending on indicators such as the vehicle velocity V and the demanded acceleration of the vehicle 10, the SOC of the battery 18 for the traction motor 14, etc. For example, when the vehicle velocity V is in a low velocity range (e.g., 0 to 20 km/h), it is normal for the vehicle to be driven using only the traction motor 14. Further, when the vehicle velocity V is in a medium velocity range (e.g., 21 to 80 km/h) or a high velocity range (e.g., 81 km/h or greater), it is normal for the engine 12 to be used, and in the case that the demanded acceleration is high, the traction motor 14 is driven in addition to the engine 12. However, if the SOC of the battery 18 is low, in order to operate a non-illustrated alternator, the engine 12 may also be operated, even though the vehicle velocity V is in a low range.

[1-4. Active Vibration Damping Support apparatus 300]

As shown in FIG. 1, the active vibration damping support apparatus 300, in addition to the aforementioned engine mounts 302f, 302r, includes the ACM electronic control unit 304 (hereinafter referred to as an "ACM ECU 304").

The engine mounts 302f, 302r are arranged in a mutually separated manner in forward and rearward directions of the vehicle 10, for example, similar to the arrangement shown in FIG. 1 of JP 2011-252553 A. The respective engine mounts 302f, 302r include actuators 306 in the interiors thereof, for example, similar to the arrangement shown in FIG. 2 of JP 2011-252553 A. The actuators 306 can be constituted, for example, by solenoid valves. Alternatively, the actuators 306 can be configured to adjust, by non-illustrated valves, the negative pressure of the engine 12.

Below, the engine mounts 302f, 302r may also be referred to as ACMs 302f, 302r, signifying active control mounts that actively control engine vibration. The letters "ACM" in reference to the ACM ECU 304 carries the meaning of an active control mount.

The ACM ECU 304 serves to control the actuators 306 of the engine mounts 302f, 302r, and includes an input/output unit 310, a computational unit 312, and a memory 314. By driving the actuators 306, the ACM ECU 304 carries out a vibration suppression control for suppressing transmission of engine vibration to the vehicle body 16.

2. Control of ACM ECU 304

[2-1. Overall Process Flow at Time of Idling Stop]

Figure 2:
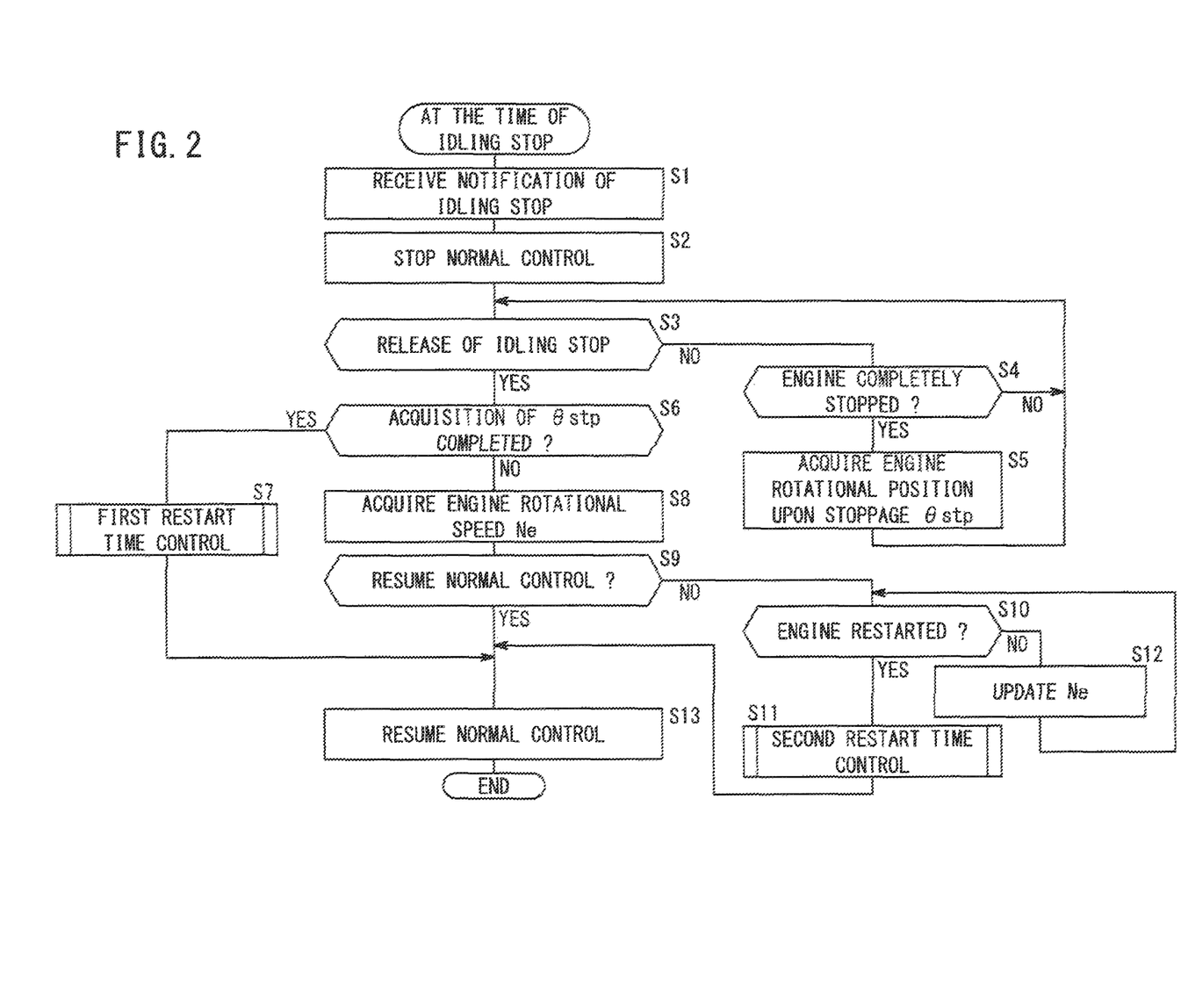
FIG. 2 is a flowchart showing processes of an ACM ECU at the time of an idling stop.
Figure 3:
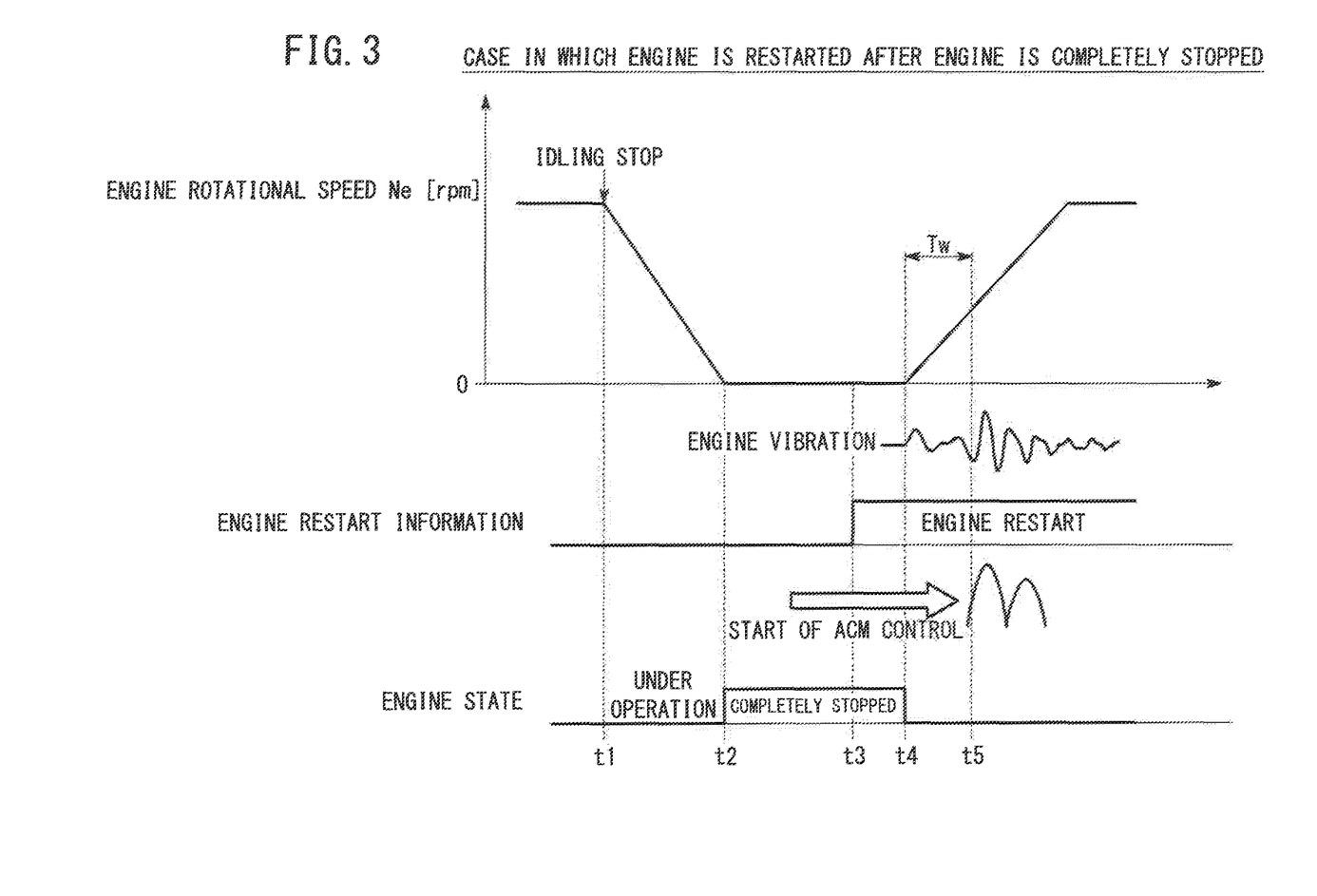
FIG. 3 is a time chart showing an example of various information, for a case in which an idling stop is released after the engine has completely stopped following performance of the idling stop.
Figure 4:
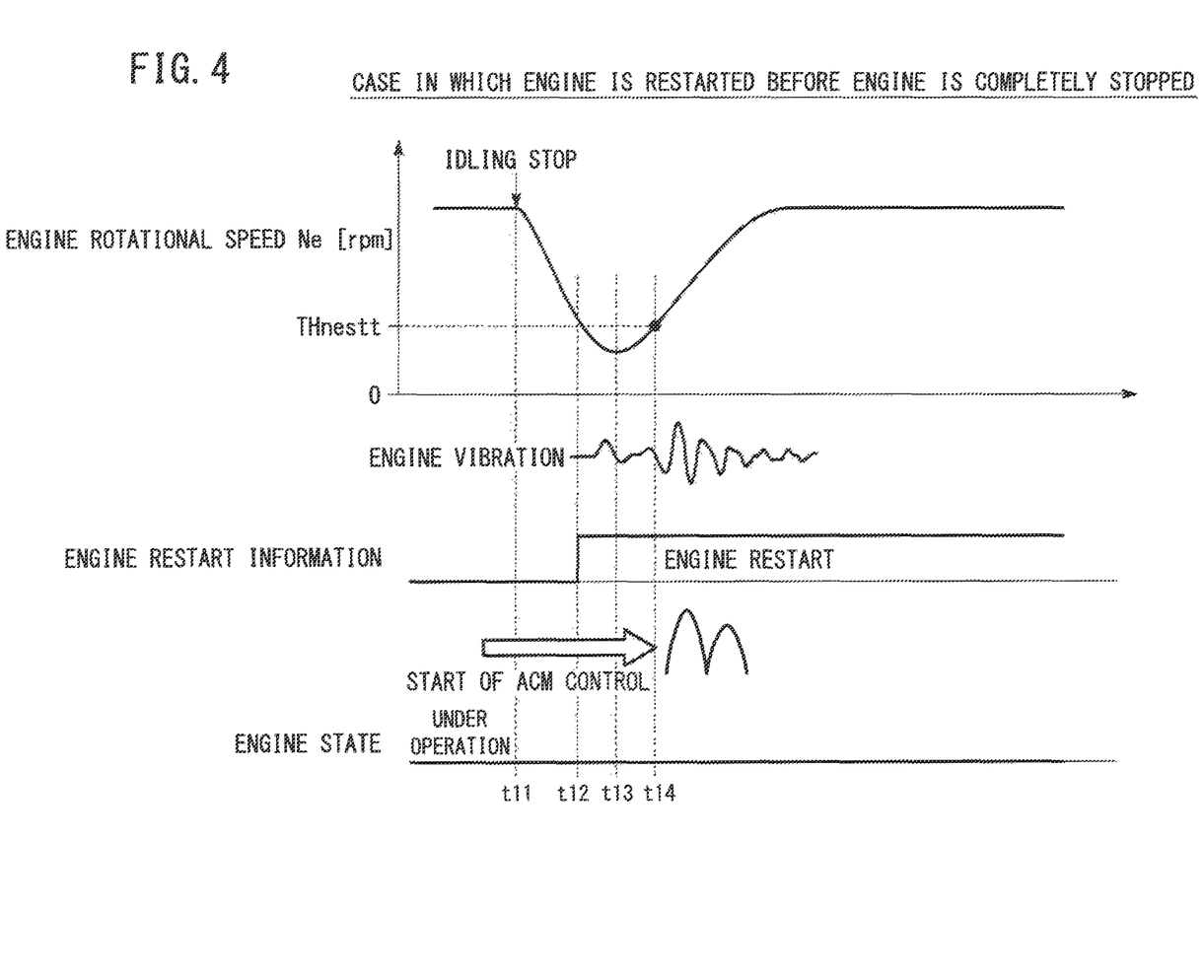
FIG. 4 is a time chart showing an example of various information, for a case in which an idling stop is released before the engine has completely stopped following performance of the idling stop.

FIG. 2 is a flowchart showing processes of the ACM ECU 304 at the time of an idling stop. FIG. 3 is a time chart showing an example of various information, for a case in which an idling stop is released after the engine 12 has completely stopped, following performance of the idling stop. FIG. 4 is a time chart showing an example of various information, for a case in which an idling stop is released before the engine 12 has completely stopped, following performance of the idling stop.

The ACM ECU 304 of the present embodiment carries out both the restart time controls and a normal control. The restart time controls are controls for suppressing so-called rolling resonance, which is generated when the engine 12 is restarted. The normal control is a control for suppressing engine vibration during operations accompanying an explosion process of the engine 12. The process shown in FIG. 2 primarily is used in the restart time controls.

Further, in the restart time controls according to the present embodiment, there are included a first restart time control and a second restart time control. The first restart time control is a control that is used in the case that the idling stop is released after the engine 12 has completely stopped (i.e., after the engine rotational speed Ne has become zero). The second restart time control is a control that is used in the case that the idling stop is released before the engine 12 has completely stopped (i.e., before the engine rotational speed Ne has become zero).

When the vehicle 10 is subjected to an idling stop (at time t1 in FIG. 3, at time t11 in FIG. 4), in step S1 of FIG. 2, the ACM ECU 304 receives notification of the idling stop from the FI ECU 108. As conditions for the idling stop in the present embodiment, for example, there can be used the fact that the vehicle velocity V is lower than a predetermined vehicle velocity threshold (first vehicle velocity threshold) and that a deceleration request (e.g., an operation to depress the brake pedal 28 or an operation to ease-up or release depression of the accelerator pedal 24) has been made. If the FI ECU 108 determines that an idling stop condition has been established, based on the vehicle velocity V, the brake pedal operating amount θbp, the accelerator pedal operating amount θap, etc., a notification of the idling stop is issued with respect to the ACM ECU 304. Then, in step S2, the ACM ECU 304 stops implementation of the normal control.

In step S3, the ACM ECU 304 judges whether or not the idling stop has been released. Such a judgment is performed based on the notification from the FI ECU 108. As conditions for release of the idling stop in the present embodiment, for example, there can be used the fact that the vehicle velocity V is higher than a predetermined vehicle velocity threshold (second vehicle velocity threshold), that an acceleration request (e.g., an operation to press the accelerator pedal 24 or an operation to ease-up or release depression of the brake pedal 28) has been made, and that the SOC of the battery 18 is lower than a predetermined SOC threshold. If the FI ECU 108 determines that the idling stop release condition has been established, based on the vehicle velocity V, the brake pedal operating amount θbp, the accelerator pedal operating amount θap, the SOC, etc., a notification of release of the idling stop is issued with respect to the ACM ECU 304.

If the idling stop has not been released (step S3: NO), then in step S4, the ACM ECU 304 judges whether or not the engine 12 is completely stopped (i.e., whether or not the engine rotational speed Ne has reached zero). Such a judgment, for example, can be performed by confirming whether or not the engine stop signal, which is a notification that the engine 12 is completely stopped, has been received from the FI ECU 108. More specifically, the judgment as to whether or not the engine rotational speed Ne has reached zero is carried out by the FI ECU 108, and the ACM ECU 304 receives the result of the judgment from the FI ECU 108. Alternatively, the ACM ECU 304 may determine whether or not the engine 12 is completely stopped, by the ACM ECU 304 judging whether or not the engine rotational speed Ne, which is calculated by the FI ECU 108 or the ACM ECU 304, has become zero.

If the engine 12 has completely stopped (step S4: YES), then in step S5, the ACM ECU 304 acquires from the FI ECU 108 (at time t2 of FIG. 3) the engine rotational position upon stoppage θstp, which is the rotational position of the engine 12 in a condition in which the engine 12 has completely stopped. In the event that the engine 12 has not completely stopped (step S4: NO), or after step S5, the process returns to step S3.

In step S3, if the idling stop has been released (step S3: YES) (at time t3 of FIG. 3, at time t12 of FIG. 4), the process proceeds to step S6.

In step S6, the ACM ECU 304 judges whether or not the engine rotational position upon stoppage θstp has been acquired, and more specifically, whether or not the engine 12 is in a completely stopped state. If the engine rotational position upon stoppage θstp has been acquired (step S6: YES), then in step S7, the ACM ECU 304 implements the first restart time control for suppressing transmission of engine vibration (rolling resonance) accompanying motoring of the engine 12, which is premised on the engine 12 being in the completely stopped condition. Details of this step will be described later with reference to FIG. 5.

If the rotational position θstp has not been acquired (step S6: NO), then in step S8, the ACM ECU 304 acquires the engine rotational speed Ne. The engine rotational speed Ne is calculated by the ACM ECU 304, for example, based on the crank pulse signal Scrk acquired from the crank sensor 102 through the FI ECU 108. Alternatively, the engine rotational speed Ne, which is calculated by the FI ECU 108 based on the crank pulse signal Scrk from the crank sensor 102, can be acquired as a result of being transmitted to the ACM ECU 304 from the FI ECU 108. Alternatively, in the case that motoring is being performed by the traction motor 14, a motor rotational speed Nmot, which is calculated by the ACM ECU 304 based on the traction motor rotational position signal Sθmot_d acquired from the resolver 202 through the motor ECU 206, may be used as the engine rotational speed Ne. Alternatively, the motor rotational speed Nmot (=engine rotational speed Ne), which is calculated by the motor ECU 206 based on the signal Sθmot_d acquired from the resolver 202, can be acquired as a result of being transmitted to the ACM ECU 304 from the motor ECU 206.

In step S9, the ACM ECU 304 judges whether or not to resume the normal control. Such a judgment is made, for example, based on whether or not the engine rotational speed Ne is in excess of a predetermined threshold (hereinafter referred to as a "normal control start judgment threshold THnml") and the amount of change in the engine rotational speed Ne (hereinafter referred to as an "engine rotational speed change amount ΔNe", a "rotational speed change amount ΔNe", or simply a "change amount ΔNe") is of a positive value. Calculation of the change amount ΔNe may be performed by any one of the FI ECU 108, the motor ECU 206, or the ACM ECU 304.

By performing the aforementioned judgment, after the idling stop has been performed, in order to suppress rolling resonance, it can be judged whether or not operating the actuator 306 achieves an effective condition (stated otherwise, whether or not the normal control should be restored without carrying out the restart time control).

In step S9, if the normal control is resumed (step S9: YES), then despite the fact that an idling stop has been performed during traveling of the vehicle 10, it is implied that the idling stop was released prior to lowering of the engine rotational speed Ne to the frequency region at which rolling resonance is generated (hereinafter referred to as a "rolling resonance region Rr"). In this case, the process progresses to step S13 without carrying out the restart time control, and the ACM ECU 304 resumes the normal control.

In step S9, if the normal control is not resumed (step S9: NO), then in step S10, the ACM ECU 304 judges whether or not the engine 12 has been restarted. Such a judgment, for example, is carried out based on a signal (start signal Sst) from the FI ECU 108. After being notified of release of the idling stop, the FI ECU 108 outputs the start signal Sst to the ACM ECU 304, when motoring (cranking) of the engine is started by the traction motor 14 or the starter motor 106.

If the engine 12 is being restarted (step S10: YES) (at time t12 of FIG. 4), then in step S11, the ACM ECU 304 implements the second restart time control for suppressing transmission of engine vibration (rolling resonance) accompanying motoring of the engine 12, which is premised on the engine 12 not being in the completely stopped condition. Details of this step will be described later with reference to FIG. 6.

If the engine 12 is not being restarted (step S10: NO), then in step S12, the ACM ECU 304 updates the engine rotational speed Ne, and the process returns to step S10.

After completion of the first restart time control (step S7) or the second restart time control (step S11), or if the normal control is to be resumed (step S9: YES), then in step S13, the ACM ECU 304 resumes the normal control.

[2-2. First Restart Time Control]

Figure 5:
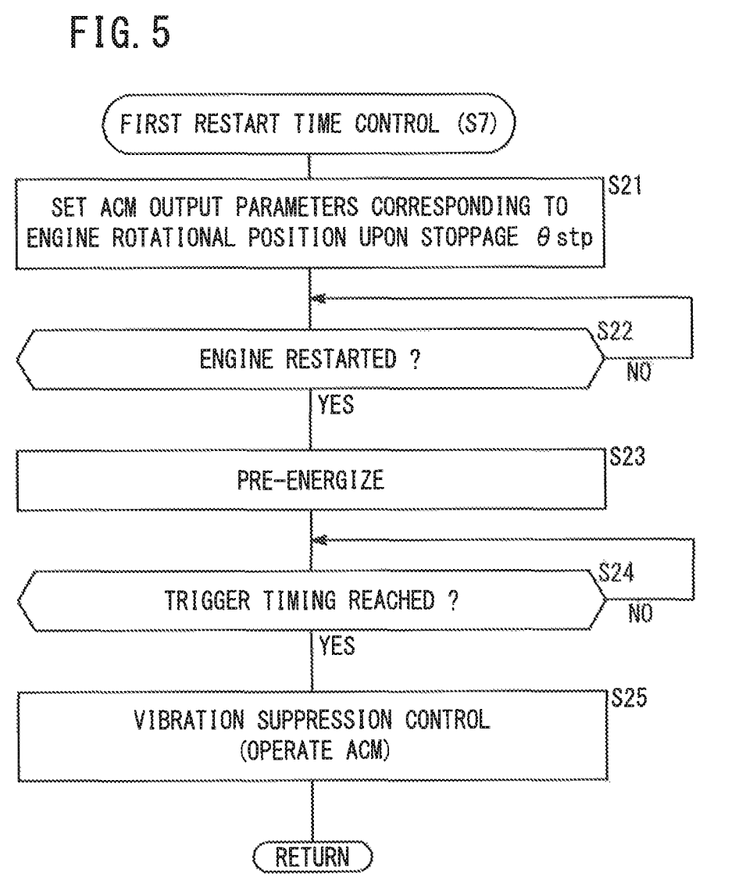
FIG. 5 is a flowchart of a first restart time control (details of step S7 of FIG. 2)

FIG. 5 is a flowchart of the first restart time control (details of step S7 of FIG. 2). In step S21, the ACM ECU 304 sets ACM output parameters corresponding to the engine rotational position upon stoppage θstp that was acquired in step S5 of FIG. 2. The ACM output parameters referred to above are parameters for realizing the operation of the actuators 306 in order to suppress rolling resonance of the engine 12. For example, in the ACM output parameters, there are included the waveform (current value and frequency) of an output current Idm to the actuators 306, and a trigger timing.

The basic specifications for the trigger timing and the output current Idm to the actuators 306 can be set in a similar manner to those disclosed in JP 2011-252553 A. For example, the trigger timing is set corresponding to the engine rotational position upon stoppage θstp that generates rolling natural vibration (rolling resonance) of the engine 12. More specifically, a standardized waiting time (standard waiting time) is set beforehand from restarting (start of motoring) of the engine 12 and until rolling resonance is generated, and thereafter, a waiting time Tw, in which a correction is added to the standard waiting time responsive to the engine rotational position upon stoppage θstp, is set. Consequently, the vibration suppression control (operation of the ACMs 302f, 302r) is started at a point in time upon elapse of the waiting time Tw from the motoring start time.

Alternatively, the time from start of motoring until rolling resonance is generated is correlated with the change in the crankshaft rotational position θ from the start of motoring until rolling resonance is generated. Thus, the trigger timing may also be set based on a threshold (hereinafter referred to as a "rotational position upon start of operations θstt") of the crankshaft rotational position θ (in this case, the number of crank pulses). The rotational position upon start of operations θstt may be a value that changes corresponding to the engine rotational position upon stoppage θstp, or may be a fixed value regardless of the rotational position θstp.

In step S22, the ACM ECU 304 judges whether or not the engine 12 has been restarted (whether or not motoring has started). Such a judgment, similar to step S10 of FIG. 2, for example, is carried out based on a signal (start signal Sst) from the FI ECU 108. If the engine 12 is not being restarted (step S22: NO), then step S22 is repeated. If the engine 12 is restarted (step S22: YES) (time t3 of FIG. 3), the process proceeds to step S23.

In step S23, the ACM ECU 304 pre-energizes one of the ACMs 302f, 302r (in this case, the front side ACM 302f), and preparations are undertaken to start output from the pre-energized ACM 302f, 302r.

In step S24, it is judged whether or not the trigger timing that was set in step S21 has been reached. As described above, for the trigger timing, there can be used the waiting time Tw (the time after receipt of the start signal Sst from the FI ECU 108 until start of the vibration suppression control), the crankshaft rotational position θ (number of crank pulses), etc.

If the trigger timing is not reached and the vibration suppression control is not started (step S24: NO), then step S24 is repeated. If the trigger timing is reached and the vibration suppression control is started (step S24: YES), then in step S25, the ACM ECU 304 implements the vibration suppression control (operates the ACMs 302f, 302r).

[2-3. Second Restart Time Control]

Figure 6:
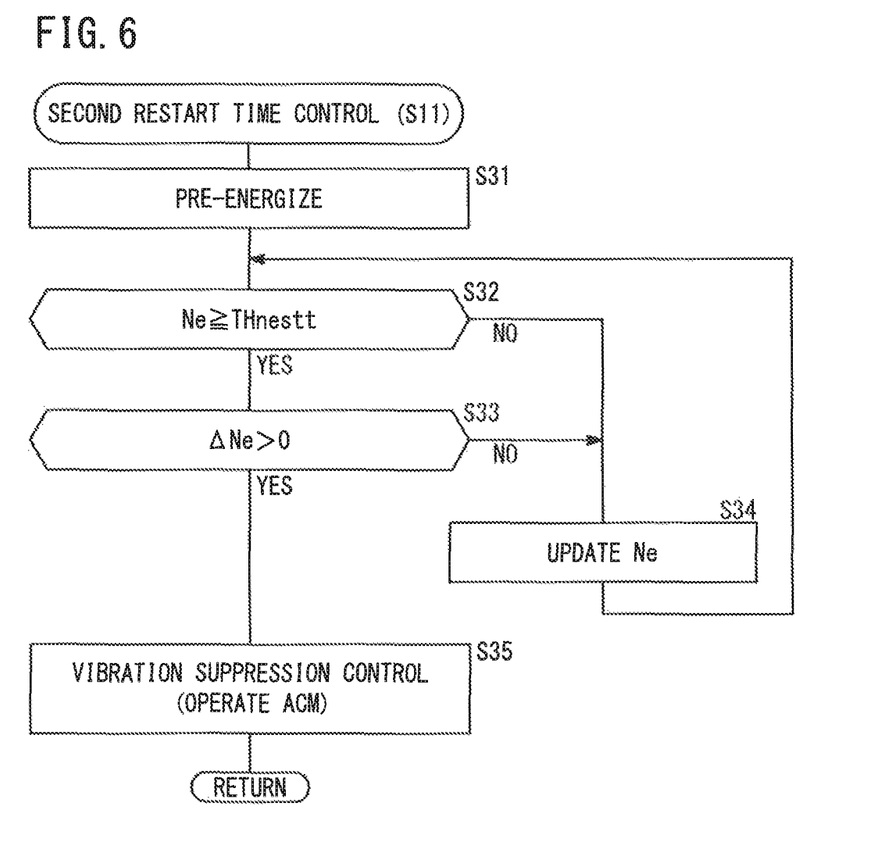
FIG. 6 is a flowchart of a second restart time control (details of step S11 of FIG. 2).

FIG. 6 is a flowchart of a second restart time control (details of step S11 of FIG. 2). In step S31, similar to step S23 of FIG. 5, the ACM ECU 304 pre-energizes one of the ACMs 302f, 302r (in this case, the front side ACM 302f), and preparations are undertaken to start output from the pre-energized ACM 302f, 302r.

In step S32, the ACM ECU 304 judges whether or not the engine rotational speed Ne is greater than or equal to a predetermined threshold (hereinafter referred to as a "second restart time control start judgment threshold THnestt" or simply a "threshold THnestt"). The threshold THnestt is an engine rotational speed Ne threshold for determining whether or not the second restart time control has been started. For example, the threshold THnestt can be set to an engine rotational speed Ne corresponding to a frequency (rolling resonance generating frequency) or a value in the vicinity thereof at which rolling resonance is generated during motoring of the engine 12.

Preferably, the threshold THnestt is set to a value that is less than or equal to the normal control start judgment threshold THnml that is used in step S9 of FIG. 2. Further, preferably, the threshold THnestt is set to be lower than the rolling resonance generating frequency. In comparison with the case of using the waiting time Tw or the rotational position upon start of operations θstt, as in the first restart time control, time is required to calculate the engine rotational speed Ne. This is because there is a possibility for a processing delay to occur for the threshold THnestt to become equalized with the engine rotational speed Ne corresponding to the rolling resonance generating frequency.

If the engine rotational speed Ne is greater than or equal to the threshold THnestt (step S32: YES), then in step S33, the ACM ECU 304 judges whether or not the engine rotational speed change amount ΔNe is positive. If the engine rotational speed change amount ΔNe is positive (step S33: YES), then in step S35, the ACM ECU 304 implements the vibration suppression control (operates the ACMs 302*f*, 302*r*).

If the engine rotational speed Ne is not greater than or equal to the threshold THnestt (step S32: NO) or if the engine rotational speed change amount ΔNe is not positive (step S33: NO), then in step S34, the ACM ECU 304 updates the engine rotational speed Ne and the process returns to step S32. Moreover, as will be described later, it is possible to judge the start of the vibration suppression control by another method aside from steps S32 through S34.

3. Advantages of the Present Embodiment

As has been described above, according to the present invention, when the idling stop of the vehicle 10 is released (step S3 of FIG. 2: YES), if the engine 12 is in a completely stopped state (step S6: YES), the first restart time control is implemented (step S7), whereas if the engine 12 is not in a completely stopped state (step S6: NO), the first restart time control is not carried out (i.e., the first restart time control is prohibited). Therefore, the first restart time control is implemented in an appropriate situation, so that the vibration damping capability can be enhanced.

According to the present invention, after the vehicle 10 has been subjected to an idling stop (at time t11 of FIG. 4) but before the engine 12 has completely stopped (step S4 of FIG. 2: NO), if it is judged that the idling stop has been released (step S3 of FIG. 2: YES) and that the engine rotational speed Ne is less than the normal control start judgment threshold THnml (first engine rotational speed threshold) (step S9: NO), the ACM ECU 304 (engine mount control apparatus) implements the second restart time control for suppressing transmission of engine vibration accompanying motoring of the engine 12, which is premised on the engine 12 not having been completely stopped (step S11).

Consequently, even in the event that the first restart time control using the engine rotational position upon stoppage θstp, which exhibits comparatively good accuracy in most cases, cannot be used, it is still possible for engine vibration to be suppressed by using the second restart time control, which is based on the engine rotational speed Ne. Accordingly, regardless of whether or not the engine 12 is in a completely stopped state, engine vibration can be suppressed, and the vibration damping capability can be enhanced.

In the present embodiment, in the first restart time control, the ACM ECU 304 (engine mount control apparatus) acquires an engine rotational position upon stoppage θstp (step S5 of FIG. 2), which is the rotational position of the engine 12 in a state in which the engine 12 is completely stopped, upon or prior to start of motoring (step S22 of FIG. 5: YES), and sets a time (operation start timing) for starting operation of the actuators 306 with respect to the engine vibration based on the engine rotational position upon stoppage θstp (step S21 of FIG. 5). If the trigger timing is reached (step S24: YES), the actuators 306 start operating with respect to the engine vibration (step S25).

In accordance with this feature, by using the engine rotational position upon stoppage θstp, engine vibration can be suppressed with high accuracy using the first restart time control.

In the present embodiment, in the second restart time control (FIG. 6), the ACM ECU 304 (engine mount control apparatus) starts operation of the actuators 306 with respect to the engine vibration (step S35), at a time that the engine rotational speed Ne is greater than or equal to the second restart time control start judgment threshold THnestt (second engine rotational speed threshold) (step S32: YES) and the engine rotational speed change amount ΔNe is positive (step S33: YES).

Consequently, even in the event that the first restart time control using the engine rotational position upon stoppage θstp, which exhibits comparatively good accuracy in most cases, cannot be used, it is still possible for engine vibration to be suppressed by using the second restart time control, which is based on the engine rotational speed Ne.

In the present embodiment, the operation timing of the actuators 306 can be a point in time after elapse of a waiting time Tw from the start of motoring (step S21 of FIG. 5). In addition, the waiting time Tw is a time period in which a correction is made to a standard waiting time that is set beforehand from motoring of the engine 12 until rolling resonance occurs (step S21). The correction is responsive to the engine rotational position upon stoppage θstp. In accordance with this feature of the invention, the standard time from motoring of the engine 12 until rolling resonance occurs can be set beforehand as the standard waiting time, whereby the standard waiting time can be corrected in accordance with the engine rotational position upon stoppage θstp. Consequently, the computational cost for calculating the operation start timing of the actuators 306 can be suppressed, and it is possible for several other calculations, which are performed by the ACM ECU 304 (engine mount control apparatus), to be implemented.

B. Modifications

The present invention is not limited to the above embodiment, but various arrangements may be adopted based on the content of the present description. For example, the present invention may adopt the following modified arrangements.

1. Objects to which the Invention can be Applied

In the above embodiment, the active vibration damping support apparatus 300 (ACM ECU 304) is incorporated in a vehicle 10 such as a hybrid vehicle (see FIG. 1). However, from the standpoint of using the first restart time control and the second restart time control, for example, the present embodiment is not limited to this feature. For example, the active vibration damping support apparatus 300 may be used in another vehicle 10 such as an engine vehicle that does not include the traction motor 14. Alternatively, the object to which the active vibration damping support apparatus 300 may be applied is not limited to the vehicle 10, and another type of mobile object (such as a ship, aircraft, etc.) equipped with the engine 12 can be used. Alternatively, the active vibration damping support apparatus 300 may be applied to manufacturing equipment, a robot, or a home appliance that is equipped with the engine 12.

2. Engine 12

According to the above embodiment, the engine 12 is a traction motor (producing the traveling drive force of the vehicle 10). However, from the standpoint of using the first restart time control and the second restart time control, the present embodiment is not limited to this feature. For example, the engine 12 may be a device that is used only for operating a non-illustrated generator.

3. Traction Motor 14 and Starter Motor 106 (Electric Motors)

According to the above embodiment, both the traction motor 14 and the starter motor 106 are used as electric motors for motoring. However, from the standpoint of using the first restart time control and the second restart time control, the starter motor 106 can be dispensed with. Further, in the case that the vehicle 10 is constituted as an engine vehicle that does not include the traction motor 14, only the starter motor 106 can be used as the aforementioned electric motor.

4. Controls Performed in the ACM ECU 304

[4-1. Crankshaft Rotational Position θcrk and Engine Rotational Speed Ne]

As described above, with the present embodiment, using the processes shown in FIGS. 2, 5, and 6, the crankshaft rotational position θcrk is used as the rotational position (engine rotational position) of the engine 12. However, from the standpoint of using the first restart time control and the second restart time control, for example, the motor rotational position θmot_d, which is detected by the resolver 202, may be used as the engine rotational position. In this case, the engine rotational position upon stoppage θstp may also be specified based on the resolver 202 (rotational position sensor) of the traction motor 14.

In a similar manner, concerning calculation of the engine rotational speed Ne, instead of using the crankshaft rotational position θcrk, the motor rotational position θmot_d, which is detected by the resolver 202, may be used to perform this calculation.

According to the present embodiment, the angular resolution of the resolver 202 is higher than that of the crank sensor 102 (the rotational position sensor of the engine 12 itself). Therefore, an engine rotational position upon stoppage θstp and an engine rotational speed Ne with improved precision can be used.

If a rotational position sensor is provided in the starter motor 106, similar actions can be performed by the starter motor 106.

[4-2. Restart Time Controls]

As described above, according to the present embodiment, both the first restart time control and the second restart time control are used as restart time controls. However, in the case that the idling stop is released before the engine 12 has completely stopped, following performance of the idling stop, from the standpoint of not-performing or prohibiting the first restart time control, it also is possible for the second restart time control not to be carried out.

As a condition for implementing the second restart time control, restarting of the engine 12, and more specifically start of motoring (step S10 of FIG. 2: YES), is used. However, at the point in time of step S10, if attention is paid to the fact that the idling stop is released, then step S10, and step S12 which is associated therewith, may be omitted. In accordance with this feature, after the vehicle 10 has been subjected to an idling stop (step S1 of FIG. 2), in the case that information indicative of the fact that a pressing operation of the accelerator pedal 24 or an easing-up or returning operation of the brake pedal 28 is acquired (step S3: YES) before the engine 12 has completely stopped (step S4: NO), then prior to start of motoring, updating of the engine rotational speed Ne is started (step S11 of FIG. 2, step S34 of FIG. 6).

Consequently, by initiating calculation of the engine rotational speed Ne from a point in time after it has been confirmed that the operation to release the idling stop has been performed by the driver, a long preparation time until the second restart time control begins can be assured, so that the calculation can be performed reliably in association with the second restart time control, or calculations can be carried out multiple times in association with the second restart time control.

With the first restart time control of the above-described embodiment (see FIG. 5), a case has been described in which, using step S24 of FIG. 5, the waiting time Tw or the crankshaft rotational position θ is used as a trigger timing (operation start timing). However, for example, in the case that the idling stop is released before the engine 12 has completely stopped, following performance of the idling stop, from the standpoint of not-performing or prohibiting the first restart time control, the method of judging the trigger timing (the start timing of the vibration suppression control) in the first restart time control is not limited to such a technique. For example, the engine rotational speed Ne (or the crankshaft rotational speed Ncrk) may be used for judging the trigger timing.

In the case that the engine rotational speed Ne (or the crankshaft rotational speed Ncrk) is used, the start timing can be judged by determining that the engine rotational speed Ne has reached the rolling resonance region Rr or a value in the vicinity thereof.

With the second restart time control of the above-described embodiment (FIG. 6), the start timing of the vibration suppression control is judged using the engine rotational speed Ne and the engine rotational speed change amount ΔNe (steps S32 and S33 of FIG. 6). However, for example, in the case that the idling stop is released before the engine 12 has completely stopped, following performance of the idling stop, from the standpoint of not-performing or prohibiting the first restart time control, the method of judging the start timing of the vibration suppression control in the second restart time control is not limited to such a technique. For example, similar to the first restart time control, the start timing may be judged using the waiting time Tw or the crankshaft rotational position θcrk.

For example, the ACM ECU 304 acquires the crankshaft rotational position θ (engine rotational position) at a point in time (i.e., the motoring start time) at which the engine 12 is restarted. In addition, the trigger timing is set based on the crankshaft rotational position θ at the time that the engine 12 is restarted (hereinafter referred to as a "restart time crankshaft rotational position θenstt"). However, in a situation in which the second restart time control is used, the engine rotational speed Ne is not zero (step S6 of FIG. 2: YES). Therefore, in addition to the restart time crankshaft rotational position θenstt, using the engine rotational speed Ne at the time that the engine 12 is restarted, the waiting time Tw or the crankshaft rotational position θ (number of crank pulses) until the rotational speed Ne reaches the rolling resonance generating frequency may be set.

The invention claimed is:

1. An engine mount control apparatus for carrying out a vibration suppression control for suppressing transmission of engine vibration to a vehicle body by driving an actuator, which is incorporated in an engine mount that supports an engine in the vehicle body, wherein the engine mount control apparatus is configured to:

judge whether or not the engine is in a completely stopped condition, at a time that an idling stop of a vehicle is released;

in a case that it is judged that the engine is in a completely stopped condition, implement a first restart time control for suppressing transmission of the engine vibration accompanying motoring of the engine, the first restart time control being premised on the engine being in the completely stopped condition; and in a case that it is judged that the engine is not in the completely stopped condition, prohibit the first restart time control.

2. The engine mount control apparatus according to claim 1, wherein the engine mount control apparatus is configured to:
- implement a normal control for suppressing the engine vibration when the engine is being operated accompanying an explosion process; and
- stop the normal control at a time that the vehicle is subjected to the idling stop;
- and further, assuming that a rotational speed of the engine in which rolling resonance is generated during motoring of the engine is defined as a rolling resonance generating engine rotational speed,
- the engine mount control apparatus is configured to implement a second restart time control for suppressing transmission of the engine vibration accompanying the motoring of the engine, the second restart time control being premised on the engine not having been completely stopped, in a case that during a period of time after the vehicle has been subjected to the idling stop but before the engine has completely stopped, it is judged that the idling stop has been released and that the rotational speed of the engine is less than a first engine rotational speed threshold, which is the rolling resonance generating engine rotational speed or a value in vicinity thereof, or it is judged that the idling stop has been released and that a rotational position of the engine is less than a first engine rotational position threshold, which is a rotational position corresponding to the rolling resonance generating engine rotational speed or a value in vicinity thereof.

3. The engine mount control apparatus according to claim 2, wherein, in the second restart time control, the engine mount control apparatus is configured to start operation of the actuator with respect to the engine vibration, at a time that the rotational speed of the engine is less than or equal to the first engine rotational speed threshold and greater than or equal to a second engine rotational speed threshold, and a rate of change of the rotational speed of the engine is positive, or at a time that the rotational position of the engine is less than or equal to the first engine rotational position threshold and greater than or equal to a second engine rotational position threshold, and the rate of change of the rotational speed of the engine is positive.

4. The engine mount control apparatus according to claim 3, wherein the rotational position and the rotational speed of the engine is calculated or acquired, based on an output of a rotational position sensor of a traction motor or a starter motor.

5. The engine mount control apparatus according to claim 3, wherein the engine mount control apparatus is configured to start calculation or acquisition of the rotational position of the engine before the motoring is started, in a case that information is acquired, which indicates that a pressing operation of an accelerator pedal or a returning operation of a brake pedal is being carried out, after the vehicle is subjected to the idling stop and before the engine is completely stopped.

6. The engine mount control apparatus according to claim 3, wherein the engine mount control apparatus is configured to start calculation or acquisition of the rotational speed of the engine before the motoring is started, in a case that information is acquired, which indicates that a pressing operation of an accelerator pedal or a returning operation of a brake pedal is being carried out, after the vehicle is subjected to the idling stop and before the engine is completely stopped.

7. The engine mount control apparatus according to claim 1, wherein, in the first restart time control, the engine mount control apparatus is configured to:
- acquire an engine rotational position upon stoppage, which is a rotational position of the engine in a state in which the engine is completely stopped, upon or prior to start of the motoring;
- set an operation start timing for starting operation of the actuator with respect to the engine vibration based on the engine rotational position upon stoppage; and
- when the operation start timing is reached, start operation of the actuator with respect to the engine vibration.

8. The engine mount control apparatus to claim 7, wherein the rotational position of the engine is calculated or acquired, based on an output of a rotational position sensor of a traction motor or a starter motor.

9. The engine mount control apparatus according to claim 7, wherein:
- the operation start timing is a point in time after elapse of a waiting time from the start of the motoring; and
- the waiting time is a time period in which a correction is made to a standard waiting time that is set beforehand from the motoring of the engine until rolling resonance occurs, the correction being responsive to the engine rotational position upon stoppage.

10. A vehicle equipped with an engine mount control apparatus for carrying out a vibration suppression control for suppressing transmission of engine vibration to a vehicle body by driving an actuator, which is incorporated in an engine mount that supports an engine in the vehicle body, wherein the engine mount control apparatus is configured to:
- judge whether or not the engine is in a completely stopped condition, at a time that an idling stop of a vehicle is released;
- in a case that it is judged that the engine is in a completely stopped condition, implement a first restart time control for suppressing transmission of the engine vibration accompanying motoring of the engine, the first restart time control being premised on the engine being in the completely stopped condition; and
- in a case that it is judged that the engine is not in the completely stopped condition, prohibit the first restart time control.

* * * * *